United States Patent Office 3,282,648
Patented Nov. 1, 1966

3,282,648
PROCESS FOR THE PREPARATION OF NICKEL CARBONYL FROM NICKEL CHLORIDE AND CARBON MONOXIDE
Gian Paolo Chiusoli and Giuseppe Mondelli, both of Novara, Italy, assignors to Montecatini Societa Generale per l'Industria Mineraria e Chimica, Milan, Italy, a corporation of Italy
No Drawing. Filed June 20, 1962, Ser. No. 203,704
Claims priority, application Italy, June 23, 1961, 11,603/61
4 Claims. (Cl. 23—203)

The present invention relates to a new method for preparing nickel carbonyl from nickel chloride, carbon monoxide and finely divided iron in the presence of a sulfurated promoter.

Nickel carbonyl is a valuable intermediate for organic reactions, and the problem of devising an easy method of preparation for this compound using nickel salts has been investigated by various authors. In particular, the technical literature discloses the possibility of obtaining nickel carbonyl by starting either with ammoniacal nickel chloride or with nickel hydrate and employing treatments at about 100° C. with carbon monoxide under pressure, in the presence of sulfurated promoters (see W. Reppe: "Neue Entwicklungen auf dem Gebiet der Chemie des Acetylene und Kohlenoxyde, Springer, Berlin, 1949; J. F. Kincaid and J. S. Strong (Rohm & Haas), U.S. Patent 2,548,727 (1951)).

It has been also shown in recent works that nickel carbonyl can be obtained by starting with ammoniacal nickel chloride solutions and carbon monoxide in the presence of stoichiometric amounts of sodium hydrosulphite (W. Hieber and E. U. Fisher, Z. Anorg. Ch. 269, 292 (1952)), or even preferably in the presence of formamidinsulfinic acid, the oxidation product of thiourea with hydrogen peroxide (E. U. Fischer and W. Hieber, Z. Anorg. Ch. 271, 229 (1953)).

We have now discovered a new method for preparing nickel carbonyl, which in comparison with known methods, has the advantage of employing readily available and low cost starting materials, and above all, has the advantage of being extremely simple and easy to carry out.

This method comprises reacting nickel chloride and carbon monoxide in aqueous, aqueous-alcohol, such as aqueous methanol, or alcoholic solutions, in the presence of finely subdivided iron and a sulfurated promoter such as preferably sodium sulphide, sodium thiosulfate and mixtures thereof.

It is therefore an object of the present invention to provide an economical and technically simple process for preparing nickel carbonyl.

Further objects and advantages of the invention will become hereinafter apparent.

The reaction according to the process of the present invention occurs at room temperature under atmospheric pressure, and requires no particular additional expedients. Naturally, at higher (super atmospheric) pressure a greater reaction velocity is obtained.

The finely divided iron suitable for carrying out the reaction according to this invention may be obtained from the conventional iron filings or turnings, from the iron roak available on the market or from the milling of the metal until a powder capable of passing through a 16,000 mesh/sq. cm. sieve is obtained. The subdivided iron is employed in a slightly higher amount than the stoichiometric amount required with respect to the nickel chloride. The iron acts by displacing the nickel from its chloride thus making the nickel suitable for the reaction with carbon monoxide. This action is more efficient the higher the degree of the subdivision of the iron.

It is to be noted that iron powder becomes pyrophoric when a high degree of subdivision is attained.

Owing to the low cost of the iron and to the further possibility of employing discarded iron materials, the employment of the subdivided iron according to the present invention represents a significant technical advance. Because of this availability of the iron materials it is generally not necessary or desirable to attempt to recover the iron from the process.

The nickel is transformed to an extent higher than 90%. The recovery of small remaining amounts of nickel is not necessary, since in most cases when nickel carbonyl is employed in organic reactions, generally no high nickel consumption occurs. In this connection there can be mentioned particularly the synthesis of acrylic acid and esters from acetylene, carbon monoxide and nickel carbonyl (see the above work by W. Reppe) as well as the synthesis of acids and esters of 2,5 diene series from allyl chloro-derivatives, acetylene, carbon monoxide and nickel carbonyl (G. P. Chiusoli, Ang. Chem., 72, 74 (1960)).

The sulfurated promoter is employed in an amount of 0.05 to 0.15 mol per mol of nickel chloride. The solid substance, which is filtered from the reaction mixture and contains iron and nickel sulfide may be recycled.

Any suitable temperature may be employed for the reaction; temperatures of 0° to 60° C. being preferable.

A factor of significance in a nickel carbonyl synthesis is the formation time since it is generally always profitable to avoid excessive equipment volumes. When operating under pressure the reactor volume is greatly reduced. Accordingly, it may be useful to stop the reaction when the filtered mixture yields a nickel-free solution, while recycling the solid portion for a partial further transformation.

The reaction is carried out in a liquid medium. Water and methanol are the most suitable solvents. When methanol is employed it may be separated by means of a simple distillation. Aqueous-alcoholic solvents, such as aqueous-methanol, are also suitable.

Any suitable amount of iron may be employed; preferably an amount in the range from 1 to 1.5 mols per mol of nickel chloride.

During the reaction minute amounts of iron carbonyl are also formed. This generally causes no trouble in the organic reactions wherein nickel carbonyl is employed.

In any case, the iron and nickel carbonyls may be easily separated owing to the remarkable volatility of nickel carbonyl. Any drawbacks resulting from this high volatility, however, are negligible when the reaction mixture is maintained at a sufficiently low temperature.

The operation of the instant process is extremely simple, since it involves only the securing of good contact between carbon monoxide, the iron suspension and the nickel chloride solution.

According to an alternative expedient, whereby a more regular nickel carbonyl supply is insured, the nickel chloride solution and other reactants may be gradually introduced into the reaction vessel simultaneously with the CO stream. It is apparent that, in any case, a constant supply may be always achieved when a plurality of reactors having a different feed utilization rate are available, and the particular individual reactor used is suitably adjusted according to conventional techniques.

The following examples are given for a better understanding of the invention; however, it should be understood that the present invention is not limited to these specific examples.

All parts and proportions are by weight unless otherwise indicated.

Example 1

30 g. of hexahydrate nickel chloride, 10 g. of recently ground iron which has been sieved through a 16,000 mesh/sq. cm. sieve, 1 g. of commercial ennea-hydrate sodium sulfide, 2.5 g. of sodium thiosulfate, and 200 ml. of degassed water are introduced in a 5-neck, 500-ml. flask provided with mecahnical stirrer, gas inlet and/outlet pipes and thermometer, while passing therethrough (at 20° C.) a CO stream with 5 liters/hour delivery rate.

Nickel carbonyl formation begins almost immediately and proceeds rapidly. The nickel carbonyl carried by the gas is collected and converted to nickel bromide by bubbling into Drechsel bottles containing bromine water. After 6 hours, the gas has carried along 16.1 g. of nickel carbonyl (theoretical amount=21.5).

The reaction mixture is filtered off. The filtrate contains only traces of nickel. The residue contains about 1.8 g. of nickel and is recycled.

In a further test the nickel carbonyl is collected by condensation in a proper trap kept at low temperature, and the same results are obtained. In contrast, when the reaction is continued for 15 hours rather than for 6 hours, after filtration the nickel found in the residue weights 0.6 g. thus corresponding to a 92% transformation.

Example 2

30 g. hexahydrate nickel chloride, 10 g. of recently ground iron which has been passed through a 16,000 mesh sieve, 1 g. of commercial ennea-hydrate sodium sulfide, 2.5 g. of sodium thiosulfate and 200 ml. of methanol are introduced in the apparatus described in the preceding example, while passing therethrough (at 20° C.) a CO stream at a rate of 5 liters per hour.

Nickel carbonyl formation begins almost immediately and proceeds rapidly. The nickel carbonyl carried along by the gas is collected and converted to nickel bromide by bubbling into Drechsel bottles containing bromine water. After 6 hours, 18.3 g. nickel carbonyl are collected (theoretical amount=21.5 g.). Only traces of nickel are contained in the residual solution after filtering. The solid residue of filtration contains 1.1 g. of nickel and is recycled.

Example 3

A two-liter horizontal autoclave provided with an agitator, gas inlet and outlet cocks, a thermocouple sheath and a manometer is employed. 180 g. of hexahydrate nickel chloride dissolved in 500 cc. of water, 6 g. of commercial ennea-hydrate sodium sulfide, 15 g. of sodium thiosulfate, 700 cc. of water and 60 g. of iron, which has been freshly ground and sieved through a 16,000 mesh/sg. cm. sieve, are introduced in order.

Agitation is started and adjusted at 250 r.p.m. After some flushings with pure nitrogen, oxygen-free carbon monoxide is introduced up to a pressure of 15 atmospheres, while water circulation in the autoclave jacket maintains the temperature at about 20° C.

Absorption starts immediately and carbon monoxide is gradually fed as it is absorbed, up to the aforementioned pressure.

After 66 minutes, the absorption is practically ceased and the autoclave is discharged. The nickel carbonyl obtained, amounting to 101.8 g., is withdrawn under a carbon monoxide stream and is condensed in a cold trap. The reaction mixture is filtered. The solution obtained after filtration contains only traces of $Ni^{++}$. The solid residue of the filtration contains about 9.4 g. of nickel, mostly in the form of nickel sulfide.

Example 4

180 g. of hexahydro nickel chloride dissolved in 500 cc. of water, 6 g. of commercial ennea-hydrate sodium sulfide, 15 g. of sodium thiosulfate, 700 cc. of water and 60 g. of iron, which has been freshly ground and sieved through a 16,000 mesh/sq. cm. sieve, are introduced in the above indicated order into the apparatus described in Example 3.

Agitation is started and adjusted at about 250 r.p.m. After several flushings with pure nitrogen, oxygen-free carbon monoxide is introduced up to a pressure of 15 atmospheres while the temperature is kept at 50–60° C. by circulating water in the autoclave jacket.

The absorption starts immediately and carbon monoxide is gradually fed as its absorption proceeds, up to the aforementioned pressure.

After 43 minutes, the absorption practically ceases and the autoclave is discharged.

The nickel carbonyl obtained, amounting to 104.1 g., is withdrawn under a carbon monoxide stream and is condensed in a cold trap. The solution after filtration contains only traces of $Ni^{++}$.

The solid residue of the filtration contains about 8.6 g. of nickel, 24.5 g. of iron and about 4 g. of sulfur.

The iron carbonyls formed correspond to about 0.3 g. of iron.

Many variations and modifications can, of course, be made without departing from the scope and spirit of the present invention.

Having thus described the invention, what it is desired to secure and claim by Letters Patent is:

1. A process for preparing nickel carbonyl, which comprises reacting, while agitating, iron powder of such fineness as to pass a 16,000 mesh/sq. cm. screen with nickel chloride and carbon monoxide, in a liquid medium selected from the group consisting of water, aqueous methanol, and methanol under correlated temperature and pressure conditions of from 20° C. to 60° C. and from atmospheric pressure to 15 atmospheres, the upper temperatures in the range 20° C. to 60° C. being at 15 atmospheres, and in the presence of from 0.05 to 0.15 mol, per mol of nickel chloride, of at least one sulfurated promoter selected from the group consisting of sodium sulfide, sodium thiosulfate and mixtures of sodium sulfide and sodium thiosulfate, the iron powder being present in the liquid reaction medium in an amount of from about 1.0 to 1.5 mols per mol of nickel chloride.

2. The method according to claim 1, further characterized in that the sulfurated promoter is sodium sulfide.

3. The method according to claim 1, further characterized in that the sulfurated promoter is sodium thiosulfate.

4. The method according to claim 1, characterized in that the sulfurated promoter is a mixture of sodium sulfide and sodium thiosulfate.

References Cited by the Examiner

UNITED STATES PATENTS

| | | | |
|---|---|---|---|
| 1,909,762 | 5/1933 | Grieb et al. | 23—203 |
| 2,070,079 | 2/1937 | Harrison et al. | 23—203 |
| 2,086,881 | 7/1937 | Schlecht et al. | 23—203 |
| 2,105,037 | 1/1938 | Harrison et al. | 23—203 |
| 2,245,503 | 6/1941 | Schlecht et al. | 23—203 |
| 2,548,727 | 1/1948 | Kincaid et al. | 23—203 |
| 2,590,078 | 3/1952 | Maeder | 23—203 |
| 3,079,235 | 2/1963 | Dakli et al. | 23—203 |
| 3,112,179 | 11/1963 | Schmeckenbecher | 23—203 |

FOREIGN PATENTS

| | | |
|---|---|---|
| 327,956 | 4/1930 | Great Britain. |
| 347,208 | 4/1931 | Great Britain. |

OSCAR R. VERTIZ, *Primary Examiner.*

MAURICE A. BRINDISI, *Examiner.*

O. F. CRUTCHFIELD, B. H. LEVENSON,
*Assistant Examiners.*